Figure 1:
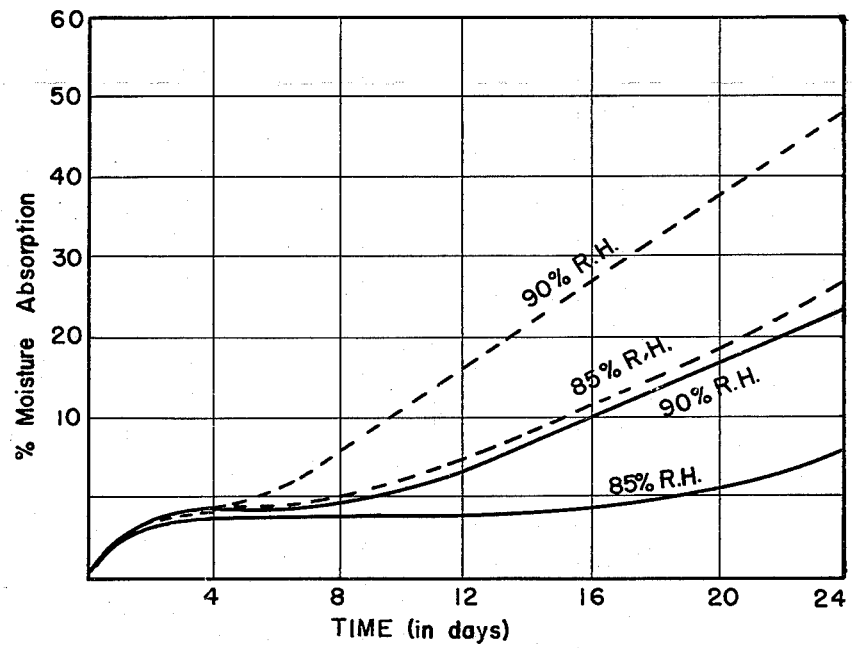

INVENTOR
WILLIAM F. WALDECK

Patented July 18, 1950

2,515,577

UNITED STATES PATENT OFFICE 2,515,577

NONCAKING ALKARYL SULFONATE DETERGENT COMPOSITION

William F. Waldeck, Grosse Ile, Mich., assignor to Wyandotte Chemicals Corporation, Wyandotte, Mich., a corporation of Michigan Application September 27, 1946, Serial No. 699,668

5 Claims. (Cl. 252—138)

The present invention relates to compositions useful as wetting, surface active and detergent products, in which the primary and essential active ingredient is a chemical compound of the alkyl aryl sulfonate type. The general object and nature of the invention is to improve the storage and keeping qualities of such products; and to prevent caking, agglomeration, deterioration and shrinkage of the bulk product, particularly when it is prepared in the spray-dried or hollow, globular particle-form.

Considerable effort has heretofore been expended upon the solution of the problem of improving the keeping and storage properties of alkyl aryl sulfonate type compositions, i. e. those derived from a petroleum hydrocarbon fraction having a boiling point in the range of 150–300° C. and an aromatic hydrocarbon of the benzene series, such as disclosed in Guenther U. S. Patent No. 2,220,099. The more commonly employed commercial variety of alkyl aryl sulfonate product, known as "sodium keryl benzene sulfonate," whose alkyl group is derived from a petroleum hydrocarbon fraction boiling in the kerosene range and whose aryl group is derived from an aromatic hydrocarbon of the benzene series or one of its homologues, when packed in non-airtight containers and stored in warehouses, on store shelves and in households, has been subject to the above mentioned deterioration in physical properties, particularly when subjected to atmospheric conditions of relatively high moisture content. Previous contributors to the art have stated that the spray drying of alkyl aryl sulfonates, admixed with 40% and above of sodium sulfate, overcomes these disadvantages. See Samaras et al. U. S. Patent No. 2,298,650 and Zizinia et al. U. S. Patent No. 2,364,767.

In Patent No. 2,298,650 the patentees have disclosed that inorganic salts other than sodium sulfate were inoperative for the purpose of producing a stable, non-caking, spray-dried alkyl aryl sulfonate product; and that sodium silicate in particular (admixed in equal parts with the sodium keryl benzene sulfonate) produced a degree and character of caking which was "most marked" (see Patent No. 2,298,650, page 2, column 2, lines 15 and 16). In contradistinction to these prior efforts to solve the problem at hand, I have made the discovery that the addition of 1-5% and preferably 3% by weight of a sodium silicate to an alkyl aryl sulfonate product, results in greatly improved storage and keeping properties.

I have also discovered that the $Na_2O/SiO_2$ mol ratio of the sodium silicate must fall within a critical range: namely between 1 mol of $Na_2O$ to 2 mols of $SiO_2$ (as the lower limit) and 1 mol of $Na_2O$ to 2.85 mols $SiO_2$ (as the upper limit). Criteria establishing the limits of this critical range will be subsequently pointed out as the description proceeds.

The composition of my invention also possesses the improved property and advantage of a substantially decreased amount of moisture absorption as compared to alkyl aryl sulfonate products in which there is no sodium silicate present.

To the accomplishment of the foregoing and related ends and to enable any person skilled in the art readily to understand and practice the invention, the following full and concise description and annexed drawing set forth the best mode in which I have contemplated applying the principle thereof.

Figure 2:
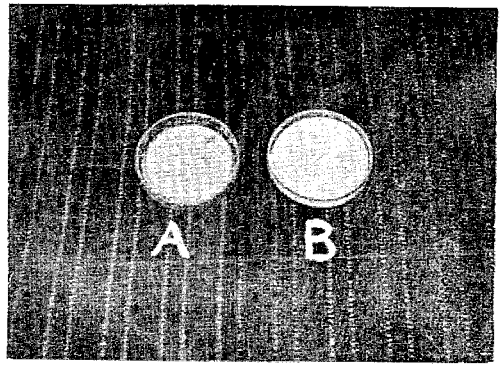

In said annexed drawing:

Fig. 1 is a chart of curves showing the relationship between the percentage amounts of moisture absorption of the compositions employing the principle of my invention as compared to those which do not contain the sodium silicate addition, and under different conditions of relative humidity; and Fig. 2 is a photograph illustrating the physical appearance of a composition employing the principle of my invention as compared to one of the prior art, both compositions having been subjected to the same atmospheric conditions of 100% relative humidity, at room temperature, for twenty days.

As previously indicated, the alkyl aryl sulfonate ingredient of the composition of my invention is suitably derived from a process involving the condensation of a petroleum hydrocarbon fraction having a boiling point in the range of 150–300° C.; and preferably a fraction within the kerosene boiling point range of about 185–250° C. (hence, the name "keryl"), with an aromatic hydrocarbon of the benzene series; followed by the sulfonation of such condensation product to form alkyl aryl sulfonic acids which are subsequently neutralized, such as by means of caustic soda, to form the water-soluble sodium alkyl aryl sulfonates. In commercial practice the sodium sulfate produced by such neutralization, and therefore inherently present in the final product, is permitted to remain, and even further extraneous amounts are added, particularly where the product is intended to be used for washing and detergent purposes. Sodium sulfate and other inorganic alkali metal or ammonium salts such as the chlorides, phosphates and carbonates may be added as "builders," all of which is of course well known practice in the sulfonated or sulfated synthetic organic detergent art. Cf. British Patent No. 352,989.

Whether pure (i. e., salt-free) alkyl aryl sulfonates or the built type (inorganic alkali metal, -sulfate, -chloride, -carbonate or -phosphate containing) are employed, the improved results of the composition of my invention are equally well obtained.

One of the more common forms of alkyl aryl sulfonate, namely sodium keryl benzene sulfonate, as usually commercially available, contains, by weight, 35–50% pure or salt-free sodium keryl benzene sulfonate and 50–65% sodium sulfate. By adding 1–5% by weight (anhydrous basis) of a sodium silicate having an $Na_2O/SiO_2$ mol ratio in the range of 1/2–1/2.85, the hereinabove mentioned objectives of my invention are obtained. Preferably such sodium silicate is added to the alkyl aryl sulfonate while the latter is in the form of an aqueous solution or slurry (at a concentration of approximately 10–50% solids content) which is then subjected to a drying operation such as by drum drying, tray drying or spray drying.

The $Na_2O/SiO_2$ mol ratio constituency of the sodium silicate has been determined to fall within the critical range above stated, as evidenced by the following factors. Where the $Na_2O/SiO_2$ mol ratio is greater than 1/2.85, such as, for example, in the case of a commercially available water glass whose mol ratio is 1/3.22, the solubility of the resultant product is substantially affected. This is particularly emphasized in the case of a spray-dried alkyl aryl sulfonate-sodium silicate composition where small shell-like insoluble particles, referred to as "ghosts," are to be observed. A satisfactory solubility of the composition is not obtained until the $Na_2O/SiO_2$ mol ratio of 1/2.85 is reached.

The other limit of the $Na_2O/SiO_2$ mol ratio range is delineated by the degree of alkalinity imparted to the resultant composition. Where the $Na_2O$ content in the sodium silicate is greater than that found in the 1 mol $Na_2O$ to 2 mols $SiO_2$ ratio corresponding to the disilicate, the alkalinity of the resultant composition becomes objectionably too great, as well as leading toward defeat of the other general purposes of the invention.

The preferred $Na_2O/SiO_2$ mol ratio constituency of the sodium silicate ingredient of my composition is on the order of 1/2.25. In order to achieve the objective above noted, the amount of such addition has been found to be in the range of 1–5% by weight of the total composition. This criterion is substantiated by the following exemplary illustration:

Example

To a 20–30% aqueous solution of sodium keryl benzene sulfonate and sodium sulfate, the sodium sulfate being present in the amount of 58% by weight, there was added 1, 2, 5, 10 and 15% by weight, respectively, of a sodium silicate having an $Na_2O/SiO_2$ mol ratio of 1/2.25. Including the original sodium keryl benzene sulfonate-$Na_2SO_4$ solution, this resulted in six samples in all, designated as numbers 1-*a* to 1-*f* inc., which were subjected to a customary spray-drying treatment. Each one of the spray-dried samples were then placed in plain chipboard, metal-end, cylindrical containers, to a level approximately three-fourths full and a reference level line marked at such point. These containers were then subjected to storage conditions wherein there was maintained a relative humidity of 77–80% and a temperature of 104±2° F. At the end of seven days of storage conditions, the containers were opened, the amount of shrinkage from the reference level measured, and the physical characteristics of the contents observed as noted in the following table.

Table

| Sample | Per Cent Sodium Silicate | Vertical Shrinkage | Physical Appearance |
|---|---|---|---|
| | | *Inches* | |
| 1-a | None | ¼ | Soft. |
| 1-b | 1 | 3/16 | Firm. |
| 1-c | 2 | 3/16 | Do. |
| 1-d | 5 | ⅛ | Do. |
| 1-e | 10 | ⅛ | Softer, damp. |
| 1-f | 15 | ⅛ | Do. |

From the above tabulated results, it will be seen that in the case of samples 1-*b*, 1-*c* and 1-*d* containing 1, 2 and 5% of sodium silicate, respectively, that the amount of vertical shrinkage was not only less than that of the sample containing no sodium silicate but also that the physical condition of the material was not deteriorated from its original condition.

The superior storage and keeping qualities of the composition of my invention, under unusually severe moisture conditions, is well illustrated by reference to Fig. 2 of the drawing. To the same sodium keryl benzene sulfonate-sodium sulfate solution referred to in the example, there was added 3% by weight of a sodium silicate having a $1Na_2O/2.25SiO_2$ mol ratio. The spray-dried product of this mixture, together with a similarly spray-dried product in which there was no sodium silicate addition, were then placed in open top Petri dishes and subjected to the storage conditions of 100% relative humidity, at room temperature for a twenty day period. Such storage conditions were maintained by placing the Petri dishes which contained sample compositions in a desiccator containing distilled water, the latter being located in a room whose temperature was maintained at 72±2° F.

In Fig. 2, the sample on the left marked "A" is the composition to which no sodium silicate has been added, and the sample marked "B" is the one containing the sodium silicate addition. Sample A, to merely visual inspection, it will be noted, is particularly shrunken and darkened. Sample B, however, still retains essentially all of its original physical appearance.

Although moisture absorption cannot precisely be said to be the controlling factor in determining the storage and keeping qualities of an alkyl aryl sulfonate type product, it nevertheless has been observed to be a material and important one. Hence, where the amount of moisture absorption of such a product can be effectively decreased, the objective of improvement in storage and keeping qualities is greatly enhanced. Results of moisture absorption tests performed upon the compositions of my invention, as compared to analogous compositions with the sodium silicate omitted, are illustrated in Fig. 1. The solid line curves in Fig. 1 represent the per cent of moisture absorbed over a period of time of the sodium keryl benzene sulfonate-sodium sulfate-sodium silicate composition of the same constituency as previously described in connection with sample B of Fig. 2. The dotted line curves of Fig. 1 represent the per cent of moisture absorption over the represented period of time of a composition which is the same as that of sample A previously described in connection with Fig. 2.

As denoted on the curves of Fig. 1, different conditions of 85 and 90% relatively humidity ("R. H.") were maintained. It will be noted that in each case, and most certainly after a four day period, the moisture absorption of the composition of my invention was considerably less than that of the analogous compositions containing no sodium silicate additive.

Although the foregoing detailed description has dealt primarily with an alkyl aryl sulfonate of the sodium keryl benzene sulfonate-$Na_2SO_4$ species, my invention is equally well applicable to and operable with equivalent alkyl aryl sulfonates such as those which might be derived from other and/or larger portions of the 150–300° C. petroleum fraction boiling range than a "kerosene-cut" and from other homologues of benzene such as toluene, xylene, etc. Likewise the alkyl aryl sulfonate ingredient of my composition may be present in either its inorganic sulfate-free or in its inorganic sulfate-containing-form. Other inorganic salt builders than sodium sulfate, namely sodium carbonate, -bicarbonate, molecularly combined carbonates and bicarbonates commonly called "modified soda," sodium chloride, and sodium phosphates such as trisodium phosphate, disodium phosphate, tetrasodium pyrophosphate and the molecularly dehydrated derivatives of the latter (metaphosphate, tetraphosphate, tripolyphosphate) may equally well be employed, all within the purview and scope of my invention.

Other modes of applying the principle of my invention in addition to that hereinabove described and illustrated in detail may be employed, provided the combination of ingredients recited in any of the following claims or the equivalent of such ingredients be employed.

I, therefore, particularly point out and distinctly claim as my invention:

1. A detergent composition consisting essentially of as its primary active ingredient 35–50% by weight of an alkyl aryl sulfonate whose alkyl group is derived from a petroleum hydrocarbon fraction boiling between 150–300° C. and whose aryl group is derived from a hydrocarbon of the benzene series, 50–65% of an inorganic salt builder, selected from the group of the alkali metal sulfates, -chlorides, -phosphates, and -carbonates, and a sodium silicate whose $Na_2O/SiO_2$ mol ratio is in the range of 1/2 to 1/2.85, said sodium silicate being present in the amount of 1–5% by weight of the total composition.

2. A detergent composition consisting essentially of by weight, 35–50% sodium keryl benzene sulfonate, 50–65% sodium sulfate, and 1–5% of a sodium silicate whose $Na_2O/SiO_2$ mol ratio is in the range of 1/2 to 1/2.85.

3. A detergent composition consisting essentially of by weight, 35–50% sodium keryl benzene sulfonate, 50–65% sodium sulfate, and 3% of a sodium silicate having an $Na_2O/SiO_2$ mol ratio of 1/2.25.

4. A spray-dried composition whose particles are of substantially hollow, globular shape, and having improved properties of resistance to shrinkage, to agglomeration of the particles and to moisture absorption, consisting of by weight, 35–50% sodium keryl benzene sulfonate, 50–65% sodium sulfate and 1–5% of a sodium silicate having an $Na_2O/SiO_2$ mol ratio of 1/2 to 1/2.85.

5. A spray-dried composition whose particles are of substantially hollow, globular shape, and having improved properties of resistance to shrinkage, to agglomeration of the particles and to moisture absorption, consisting of by weight, 35–50% sodium keryl benzene sulfonate, 50–65% sodium sulfate and 3% of a sodium silicate having an $Na_2O/SiO_2$ mol ratio of 1/2.25.

WILLIAM F. WALDECK.

REFERENCES CITED

The following references are of record in the file of this patent:

UNITED STATES PATENTS

| Number | Name | Date |
|---|---|---|
| 2,091,202 | Hallock | Aug. 24, 1937 |
| 2,244,512 | Brandt | June 3, 1941 |
| 2,298,650 | Samaras | Oct. 13, 1942 |
| 2,298,651 | Samaras | Oct. 13, 1942 |
| 2,397,133 | Flett | Mar. 26, 1946 |

OTHER REFERENCES

Vail: "Soluble Silicates in Industry," 1928, ACS Monograph, pages 362–365.

Publication, "National Nacconol NR," National Aniline and Chemical Co., 1938, page 22.